US012099451B2

(12) United States Patent
Moyer

(10) Patent No.: US 12,099,451 B2
(45) Date of Patent: Sep. 24, 2024

(54) RE-REFERENCE INTERVAL PREDICTION (RRIP) WITH PSEUDO-LRU SUPPLEMENTAL AGE INFORMATION

(71) Applicant: Advanced Micro Devices, Inc., Santa Clara, CA (US)

(72) Inventor: Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/489,726

(22) Filed: Sep. 29, 2021

(65) Prior Publication Data

US 2023/0102891 A1 Mar. 30, 2023

(51) Int. Cl.
*G06F 12/12* (2016.01)
*G06F 12/122* (2016.01)
*G06F 12/123* (2016.01)
*G06F 12/127* (2016.01)

(52) U.S. Cl.
CPC .......... *G06F 12/122* (2013.01); *G06F 12/123* (2013.01); *G06F 12/124* (2013.01); *G06F 12/127* (2013.01); *G06F 2212/60* (2013.01)

(58) Field of Classification Search
CPC ...... G06F 12/122; G06F 12/12; G06F 12/123; G06F 12/124; G06F 12/128; G06F 12/127
See application file for complete search history.

(56) References Cited

U.S. PATENT DOCUMENTS

| 9,753,862 | B1* | 9/2017 | Drerup | G06F 12/0864 |
| 10,691,613 | B1* | 6/2020 | Tong | G06F 12/0868 |
| 2006/0218352 | A1* | 9/2006 | Shannon | G06F 12/128 |
| | | | | 711/E12.024 |
| 2009/0113137 | A1* | 4/2009 | Grayson | G06F 12/128 |
| | | | | 711/136 |
| 2009/0182952 | A1* | 7/2009 | Moyer | G06F 12/126 |
| | | | | 711/E12.001 |
| 2011/0055485 | A1* | 3/2011 | Eddy | G06F 12/128 |
| | | | | 711/E12.001 |
| 2012/0096226 | A1 | 4/2012 | Thompson et al. | |
| 2014/0215161 | A1* | 7/2014 | Basel | G06F 12/122 |
| | | | | 711/136 |
| 2015/0248354 | A1* | 9/2015 | Sano | G06F 12/0864 |
| | | | | 711/136 |
| 2016/0055003 | A1* | 2/2016 | Clancy | G06F 9/3863 |
| | | | | 711/136 |

(Continued)

OTHER PUBLICATIONS

Efficient Timestamp-Based Cache Coherence Protocol for Many-Core Architectures by Yao (Year: 2016).*

(Continued)

*Primary Examiner* — Paul M Knight
(74) *Attorney, Agent, or Firm* — Volpe Koenig

(57) ABSTRACT

Systems and methods for cache replacement are disclosed. Techniques are described that determine a re-reference interval prediction (RRIP) value of respective data blocks in a cache, where an RRIP value represents a likelihood that a respective data block will be re-used within a time interval. Upon an access, by a processor, to a data segment in a memory, if the data segment is not stored in the cache, a data block in the cache to be replaced by the data segment is selected, utilizing a binary tree that tracks recency of data blocks in the cache.

22 Claims, 5 Drawing Sheets

(56) References Cited

U.S. PATENT DOCUMENTS

| | | | |
|---|---|---|---|
| 2017/0337133 A1 | 11/2017 | Bolbenes et al. | |
| 2017/0357588 A1* | 12/2017 | Moyer | G06F 12/0811 |
| 2019/0018798 A1 | 1/2019 | Al Sheikh et al. | |
| 2019/0354489 A1 | 11/2019 | Gupta et al. | |
| 2019/0370187 A1 | 12/2019 | Yu et al. | |
| 2023/0195641 A1* | 6/2023 | Allan | G06F 12/121 |
| | | | 711/129 |

OTHER PUBLICATIONS

High Performance Cache Replacement Using Re-Reference Interval Prediction (RRIP) (Year: 2010).*
Pseudo Least Recently Used Binary Tree by Stack Overflow 2017 (Year: 2017).*
Pseudo Re-Reference Interval Prediction for Last-Level Cache Replacement by Lim (Year: 2019).*
Insertion and Promotion for Tree-Based PseudoLRU Last-Level Caches by Jimenez 2013 (Year: 2013).*
An effectiveness-based adaptive cache replacement policy by Tian (Year: 2013).*
Jaleel, A., et. al., "High Performance Cache Replacement Using Re-Reference Interval Prediction (RRIP)", ISCA 10: Proceedings of the 37th Annual International Symposium on Computer Architecture, ACM, 12 pgs., Jun. 19, 2010.

* cited by examiner

100A

100B

200

300

400

RE-REFERENCE INTERVAL PREDICTION (RRIP) WITH PSEUDO-LRU SUPPLEMENTAL AGE INFORMATION

BACKGROUND

Caching reduces the time it takes for a processor to access data in the main memory by storing often accessed data in a memory (a cache) that is local to the processor, and therefore is faster and more efficient to access. Cache replacement algorithms (or policies) are used by cache management software to determine which data block of a cache to evict when a processor's memory-access results in a miss. That is, when a processor has to read from or to write into a data segment in the main memory, if the data segment is already stored in the cache (i.e., a cache hit), it is accessed from the cache; however, if it is not already stored in the cache (i.e., a cache miss), the data segment will be fetched from the main memory and will replace a cache's data block, as determined by a replacement algorithm.

Replacement policies predict the likelihood of each data block in the cache to be re-referenced (re-used), and, based on that choose to replace a data block that is predicted to be re-referenced in the farthest future. An example of a replacement policy is the Least Recently Used (LRU) replacement policy. The LRU replacement algorithm predicts that the least recently used data block is likely to be re-referenced in the farthest future, and, thus, selects that data block to be replaced. On the other hand, a Re-Reference Interval Prediction (RRIP) replacement algorithm, instead of recency, considers the frequency in which data blocks are re-referenced—it predicts the time interval in which a data block is likely to be re-used. Data blocks that are predicted to be re-referenced in a near-immediate time interval are preserved, while data blocks that are predicted to be re-referenced in a distant time interval are candidates for eviction.

Replacement algorithms vary, in part, by what likelihood of re-reference they assign to newly added data blocks (hit promotion polices) and how they update (learn) the likelihood of data blocks being re-used. How well a replacement algorithm performs depends on the data access pattern of the application that is executed on the processor. Assigning a likelihood of a near-immediate re-reference or a likelihood of a distant re-reference to newly added data blocks, for example, is not optimal across all access patterns. Techniques for cache replacement are needed that perform well under different data access patterns.

BRIEF DESCRIPTION OF THE DRAWINGS

A more detailed understanding can be achieved through the following description given by way of example in conjunction with the accompanying drawings wherein.

DETAILED DESCRIPTION

Figure 1A:
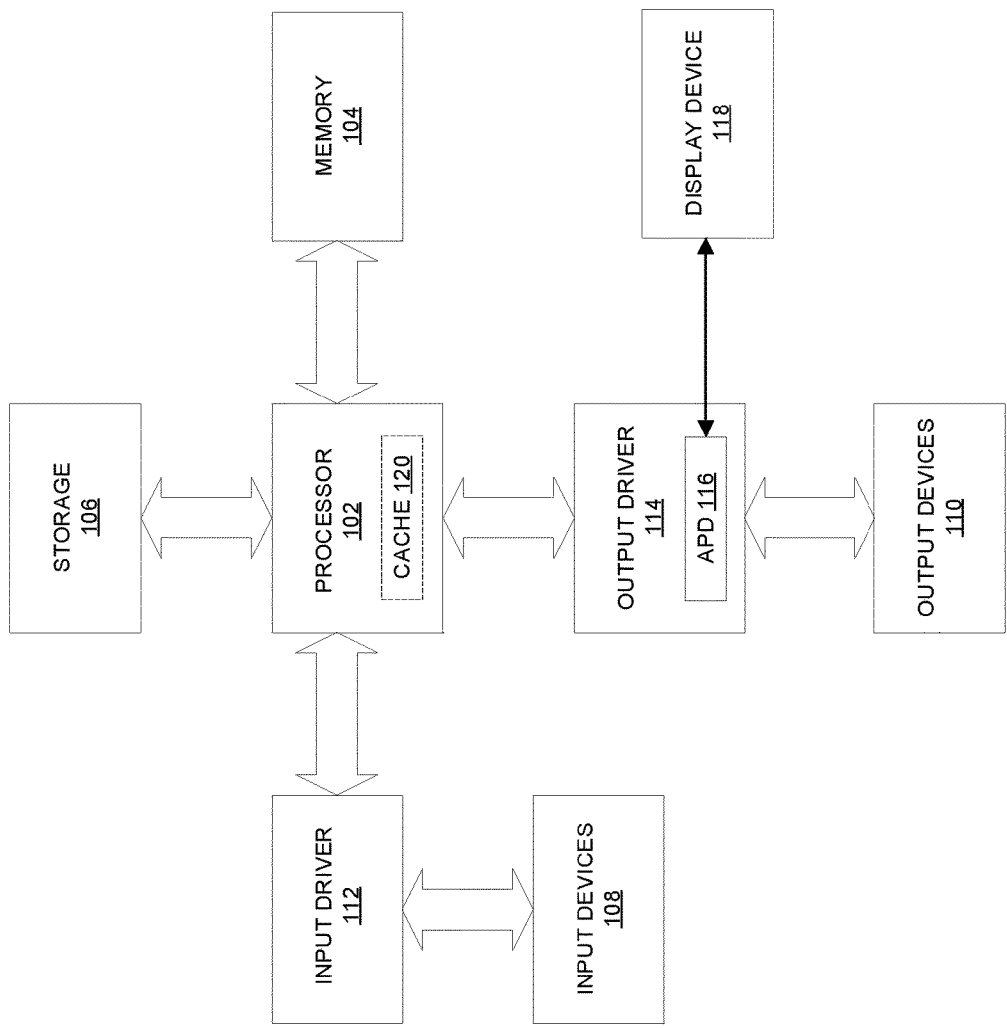
FIG. 1A is a block diagram of an example device in which one or more features of the disclosure can be implemented.

The present disclosure describes systems and methods for cache replacement that incorporate a tree-based Pseudo-LRU (PLRU) algorithm to an RRIP framework. An RRIP algorithm that learns the re-reference likelihood of each data block in the cache is described herein. The RRIP algorithm maintains RRIP values that can represent multiple re-reference time intervals. Thus, a data block can be predicted to be re-referenced at a time interval from a near-immediate time interval (the lowest RRIP value), through intermediate time intervals, to a distant time interval (the highest RRIP value). For example, when a new data block is placed in the cache, an intermediate re-reference interval can be assigned to it and each time this data block is reused it can be assigned with a shorter time interval, i.e., it is predicted to be re-referenced sooner. When a data block in the cache has to be replaced (a cache miss), a data block that is predicted to be re-referenced in the distant time interval can be selected to be replaced. If no such data block can be found in the cache, the RRIP values of the cache's data blocks are increased, a process that allows adaptation to changes in access patterns. However, when multiple data blocks with a distant time interval prediction can be found in the cache, as described herein, the binary tree of a PLRU algorithm can be utilized to select the oldest one of the data blocks. The application of the PLRU algorithm in synergy with the RRIP algorithm results in higher cache hit-ratio compared with the application of the RRIP algorithm alone given cache access patterns of many workloads.

The present disclosure describes a method for cache replacement. The method comprises determining an RRIP value associated with each of data blocks in a cache. An RRIP value represents a likelihood that an associated data block will be re-used within a time interval, wherein a larger RRIP value corresponds to a time interval farther in the future. Upon an access, by a processor, to a data segment in a memory, if the data segment is not stored in the cache, the method comprises selecting a data block in the cache to be replaced by the data segment. The selecting of a data block includes searching for data blocks in the cache associated with RRIP values having a maximum value, and when multiple data blocks are found, selecting one of the data blocks using a binary tree that tracks recency of data blocks in the cache.

The present disclosure further discloses a system that comprises at least one processor and memory. The memory stores instructions that, when executed by the at least one processor, cause the system to determine an RRIP value associated with each of the data blocks in a cache. An RRIP value represents a likelihood that an associated data block will be re-used within a time interval, wherein a larger RRIP value corresponds to a time interval farther in the future. Upon an access, by the at least one processor, to a data segment in the memory, if the data segment is not stored in the cache, the instructions cause the system to select a data block in the cache to be replaced by the data segment. The selection of a data block includes searching for data blocks in the cache associated with RRIP values having a maximum value; and when multiple data blocks are found, selecting one of the data blocks using a binary tree that tracks recency of data blocks in the cache.

Furthermore, the present disclosure discloses a non-transitory computer-readable medium comprising instructions executable by at least one processor to perform a method. The method comprises determining a re-reference interval prediction (RRIP) value associated with each of data blocks in a cache. An RRIP value represents a likelihood that an associated data block will be re-used within a time interval, wherein a larger RRIP value corresponds to a time interval farther in the future. Upon an access, by the at least one processor, to a data segment in the medium, if the data segment is not stored in the cache, the method comprises selecting a data block in the cache to be replaced by the data segment. The selection of a data block includes searching for data blocks in the cache associated with RRIP values having a maximum value; and when multiple data blocks are found, selecting one of the data blocks using a binary tree that tracks recency of data blocks in the cache.

FIG. 1A is a block diagram of an example device 100A in which one or more features of the disclosure can be implemented. The device 100A could be one of, but is not limited to, for example, a computer, a gaming device, a handheld device, a set-top box, a television, a mobile phone, a tablet computer, or other computing device. The device 100A includes a processor 102, a memory 104, a storage 106, one or more input devices 108, and one or more output devices 110. The device 100A also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices (e.g., controlling operation, receiving inputs from, and providing data to output drivers 114). It is understood that the device 100A can include additional components not shown in FIG. 1A.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache. In some implementations, the processor 102 includes one or more caches 120. As is generally known, a cache stores data items judged by a cache manager as likely to be accessed by instructions executing on the processor 102 in the near future. The cache 120 represents one or more cache memories of the processor 102. In various implementations, the one or more cache memories are organized into a cache hierarchy, where caches higher in the cache hierarchy service misses from and receive evited cache entries from caches lower in the cache hierarchy.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 1B:
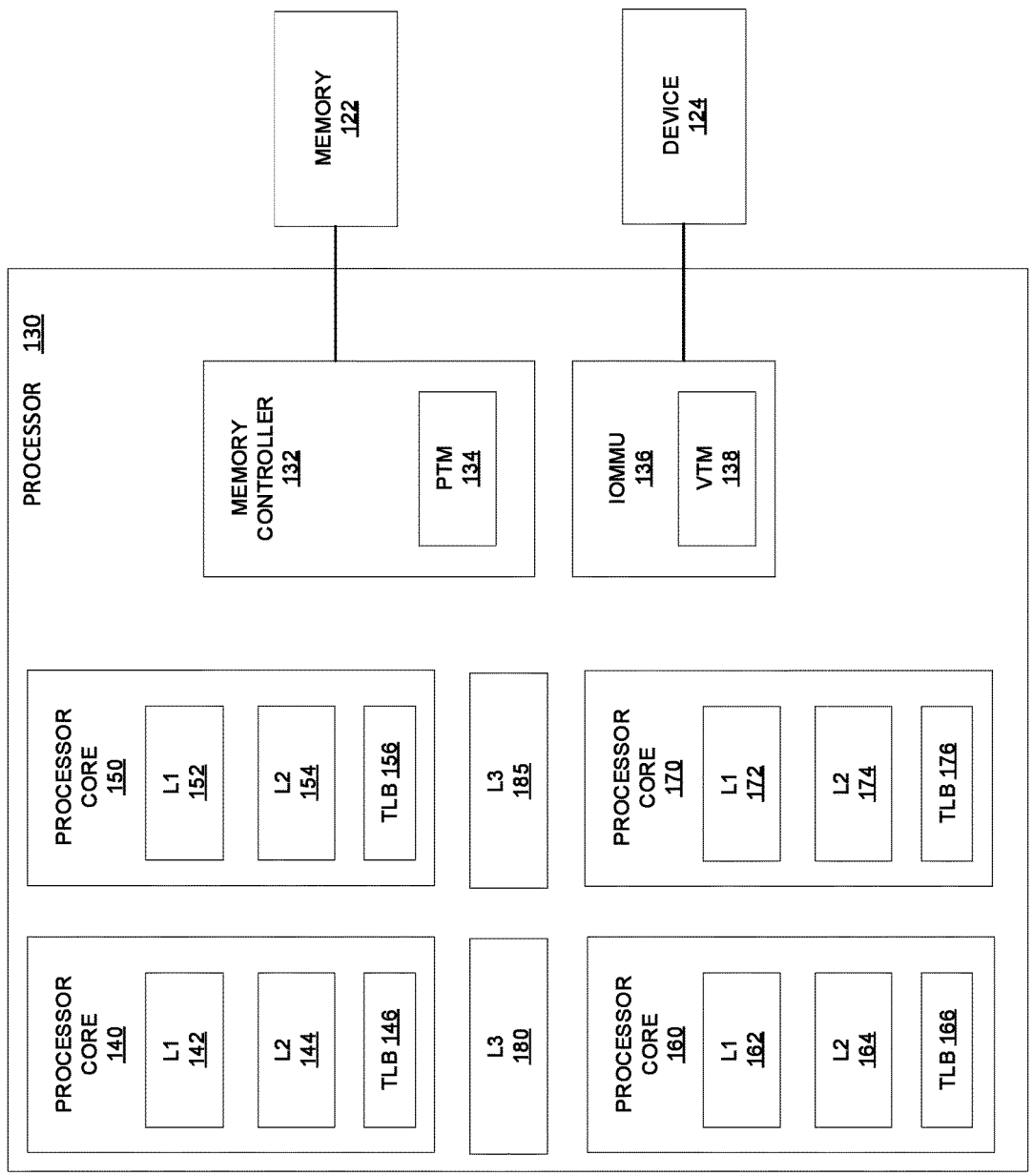
FIG. 1B is a block diagram of an example system that provides for managing memory access requests from devices in which one or more features of the disclosure can be implemented.

FIG. 1B is a block diagram of an example system 100B that provides for managing memory access requests from devices in which one or more features of the disclosure can be implemented. The system 100B includes a processor 130 and a memory 122. The system 100B can be incorporated in any of a variety of electronic devices, such as a server, personal computer, tablet, set top box, gaming system, and the like. The processor 130 is generally configured to execute sets of instructions (e.g., computer programs) that manipulate the circuitry of the processor 130 to carry out defined tasks.

The memory 122 facilitates the execution of these tasks by storing data and instructions used by the processor 130. The memory 122 can be random access memory (RAM), non-volatile memory such as flash memory or a hard disk drive (HDD), and the like, or a combination thereof. The system 100B also includes a device 124, such as a physical input/output (I/O) device. The device 124 can be, for example, a network interface card (NIC), a host bus adapter (HBA), or the like.

The processor 30 also includes processor cores 140, 150, 160, and 170 and a memory controller (e.g., a northbridge) 132. The processor cores 140, 150, 160, and 170 are processing units that individually and concurrently execute instructions. In some embodiments, each of the processor cores 140, 150, 160, and 170 includes an individual instruction pipeline that fetches instructions, decodes the fetched instructions into corresponding operations and, using the resources of the system 100B, executes various operations. While FIG. 1B illustrates a processor 130 with four processor cores 140, 150, 160, and 170, the processor 130 can have more or can have less than four processor cores. Each of the processor cores 140, 150, 160, and 170 has low level cache dedicated to the processor core. For example, the processor core 140 has a Level 1 cache 142 and a Level 2 cache 144. The processor core 140 can also include a translation lookaside buffer 146. Similarly, the processor core 150 has associated Level 1 cache 152 and Level 2 cache 154. The processor core 150 can also include a translation lookaside buffer 156. In a further example, the processor core 160 has a Level 1 cache 162 and a Level 2 cache 164. The processor core 160 can also include a translation lookaside buffer 166. In another example, the processor core 170 has a Level 1 cache 172 and a Level 2 cache 174. The processor core 170 can also include a translation lookaside buffer 176. The processor 130 can further include cache memory shared by pairs of processors. For example, processor core 140 and processor core 160 can share an L3 cache memory 180, and processor core 150 and processor core 170 can share an L3 cache memory 185.

The processor 130 also includes an input/output memory management unit (IOMMU) 136 that is used to connect devices (such as the device 124, e.g., as shown in FIG. 1A) to the memory controller 132. In some embodiments, the IOMMU 136 communicates with device 124 using a serial bus. The serial bus can comply with a bus standard, such as the Peripheral Component Interconnect Express (PCIe) serial bus standard. The memory controller 132 provides an interface for the device 124 to communicate with the memory 122 or with one or more levels of cache memory. The IOMMU 136 receives memory access requests (e.g., direct memory access requests, such as a cache injection memory access request) from the device 124 and controls provision of those requests to the memory 122 or to cache memory via memory controller 132. The processor 130, for example, at the memory controller 132, includes a physical tag map 134 to map a physical steering tag received from the IOMMU 136 into a physical resource targeted by an associated memory access request, such as a cache injection memory access request. In addition, the memory controller 132 receives responses to memory access requests from the memory 122 or cache memory and controls provision of the responses to the device 124.

The cache injection memory access request can utilize steering tags to target processor resources, such as lower level cache dedicated to a processor core, cache shared between a subset of processor cores, or a share cache. For example, the steering tag can target an L1 cache 152 or L2 cache 154 accessible by processor core 150, an L3 cache 185 accessible to processor cores 150 and 170. Accordingly, to facilitate efficient execution of memory access requests, the IOMMU 136 accesses a virtual tag map to translate virtual steering tags received in a memory access request to physical steering tag mapped to a physical resource. In response to receiving a memory access request from the device 124, the IOMMU 136 identifies a virtual steering tag and translates the virtual steering tag with the virtual tag map 138. The virtual tag map 138 can be stored in system memory 122 and portions may be cached at the IOMMU 136. Alternatively, the virtual tag map 138 can be cached at the IOMMU 136. The IOMMU 136 provides the memory access request and physical steering tag to the memory controller 132. The memory controller 132 translates the physical steering tag to a physical resource targeted by the memory access request, such as lower-level cache targeted by a cache injection memory access request. In an example, the memory access request targets a low-level cache dedicated to a processor core. In such an example, an address associated with the request can be translated by a translation lookaside buffer, and the cache injection memory access executed.

In some embodiments, the device 124 employs the memory controller 132 to access information in the memory 122 or in cache memory through direct memory access (DMA) requests by initiating a memory access request containing a virtual steering tag and a virtual address sent to the IOMMU 136. The IOMMU 136 can perform steering tag remapping between a virtual steering tag and a physical steering tag and address translation between virtual addresses and physical addresses in the memory 122 or cache memory. The steering tag remapping process and the address translation process can be independent functions of the IOMMU and can be performed concurrently. For example, the device 124 generates cache injection memory access requests, including write requests to store data at the cache memory associated with a processor executing a virtual machine having use for the data provided by the device 124. Each memory access request includes a virtual steering tag mapped through an associated physical steering tag to a cache resource (e.g., L3 cache 180 or 185; L1 cache 142, 152, 162, or 172; L2 cache 144, 154, 164, or 174) and a memory address indicating a location at the cache resource targeted by the cache injection memory access request. In response to a write request, the resource stores write information of the request at the location corresponding to the memory address of the write request.

Figure 2:
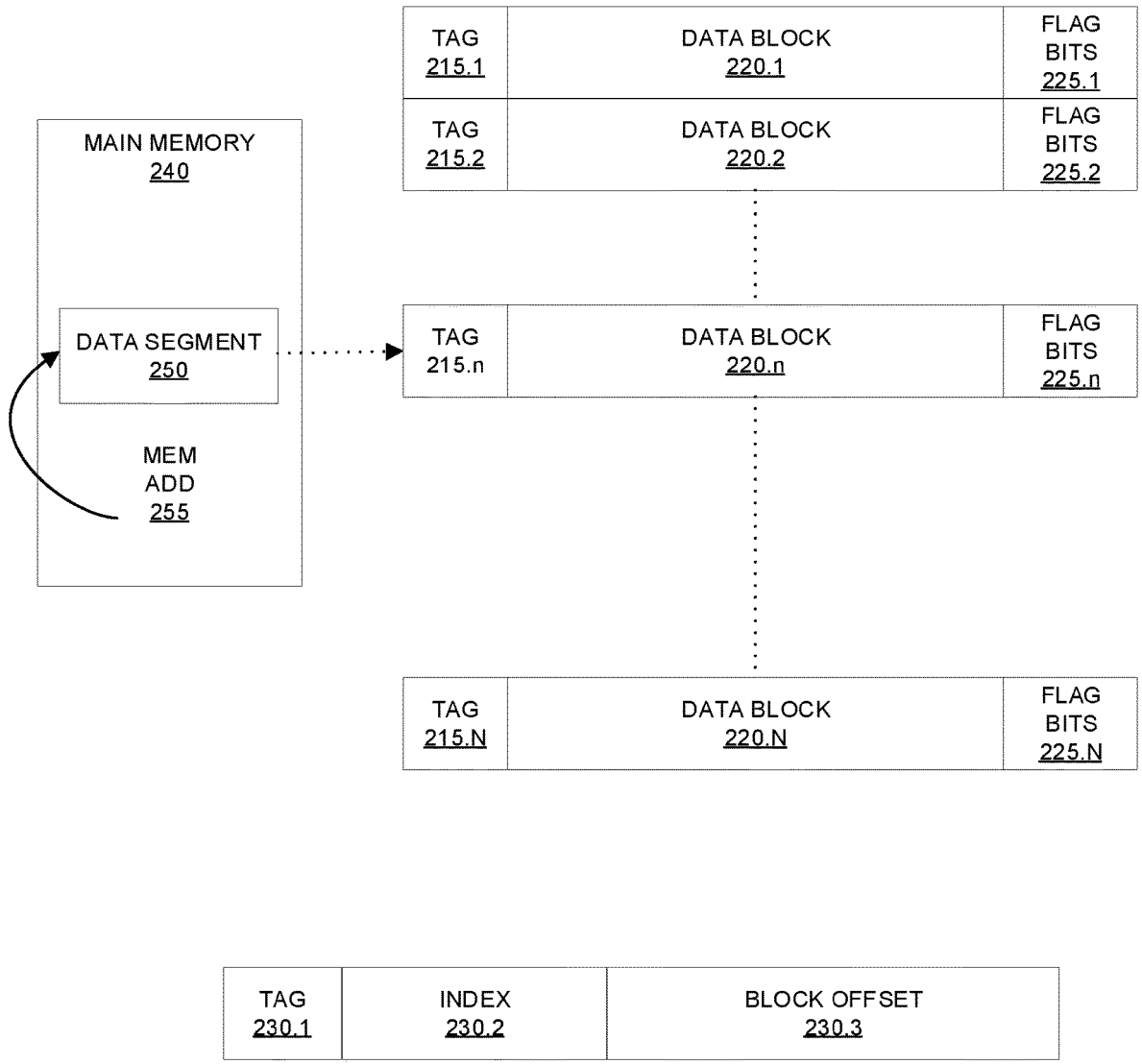
FIG. 2 is a block diagram of an example cache structure, employable by processors of the device of FIG. 1A, based on which one or more features of the disclosure can be implemented.

FIG. 2 is a block diagram of an example cache structure 200, employable by processors of the device of FIG. 1A, based on which one or more features of the disclosure can be implemented. The cache 210 includes data blocks 220.1-220.N (also called "lines"). Each data block can contain a data segment that was previously fetched from a memory. For example, line 220.n can contain data segment 250 that was fetched from an address 255 within a main memory 240. In addition to the data blocks, each line in the cache, e.g., 220.n, is associated with a tag, e.g., 215.n, and flag bits, e.g., 225.n. For example, a tag 215.n is associated with the address 255 in the main memory 240 from where a data segment 250 (currently stored in line 220.n) was fetched. The flag bits 225.n are typically used to store data that characterize (or are associated with) the corresponding data block 220.n. For example, a flag 225.n can indicate the validity of the data stored in the data block 220.n or whether the main memory has not been updated with changes made to the data stored in the data block 220.n.

Thus, tags 215.1-215.N are associated with their respective lines 220.1-220.N in the cache 210—each representing an actual or a virtual address in the main memory 240. When a processor executes an instruction that requires a memory-access—that is, the processor has to read from or write into a data segment stored at a certain address in the main memory—the cache is first checked to see whether the requested data segment is already stored in one of the lines 220.1-220.N of the cache. To find out whether a requested data segment 250 is already stored in one of the cache's lines, the data segment's address 255 can be compared to the tags 215.1-215.N of respective lines 220.1-220.N. However, in practice, a placement policy of a cache stores memory sections of the main memory (such as data segment 250) to certain locations in the cache. Accordingly, if any line in the cache can store any copy of a memory section, the cache is fully associative cache. If each memory section can be stored in only one line in the cache, the cache is a directly mapped cache. If, as usually is the case, each memory section can be stored in one set of L places in the cache, the cache is an L-way set associative cache.

Typically, the bits that represent a memory address 255 can be partitioned into groups based on their bit significance. In FIG. 2, a memory address 230 is shown to include a tag 230.1, an index 230.2, and a block offset 230.3. The block offset 230.3, having the least significant bits of the address 230, provides an offset, pointing to the location in the data block where the requested data segment 250 is stored. For example, if a data block is a b-byte block, the block offset 230.3 will have to be log $2(b)$ bits long. The index 230.2 specifies the set of data blocks in the cache where a particular memory section can be stored (e.g., one set contains L data blocks in an L-way set associative cache). For example, if there are s number of sets, the index 230.2 will have to be log $2(s)$ bits long. The tag 230.1, having the most significant bits of the address 230, associates the particular memory section with the line in the set (specified by the index) it is stored in. Thus, when searching whether a data segment is stored in the cache, the index part of the data segment's address points to the set in the cache where the data segment could be stored; then, the tag part of the data segment's address is compared with the tags of the lines in that set. If the cache 210 is a four-way set associative cache, then the cache is partitioned into sets (specified by the indexes), each set containing four ways (four data blocks or lines). If the index part of the address 255 of a data segment 250 points to the first set, the data segment 250 should be searched within this set—the tag part of data segment's address 255 can be compared with the tags of lines in that set to find whether one of those lines stores the data segment.

Figure 3:
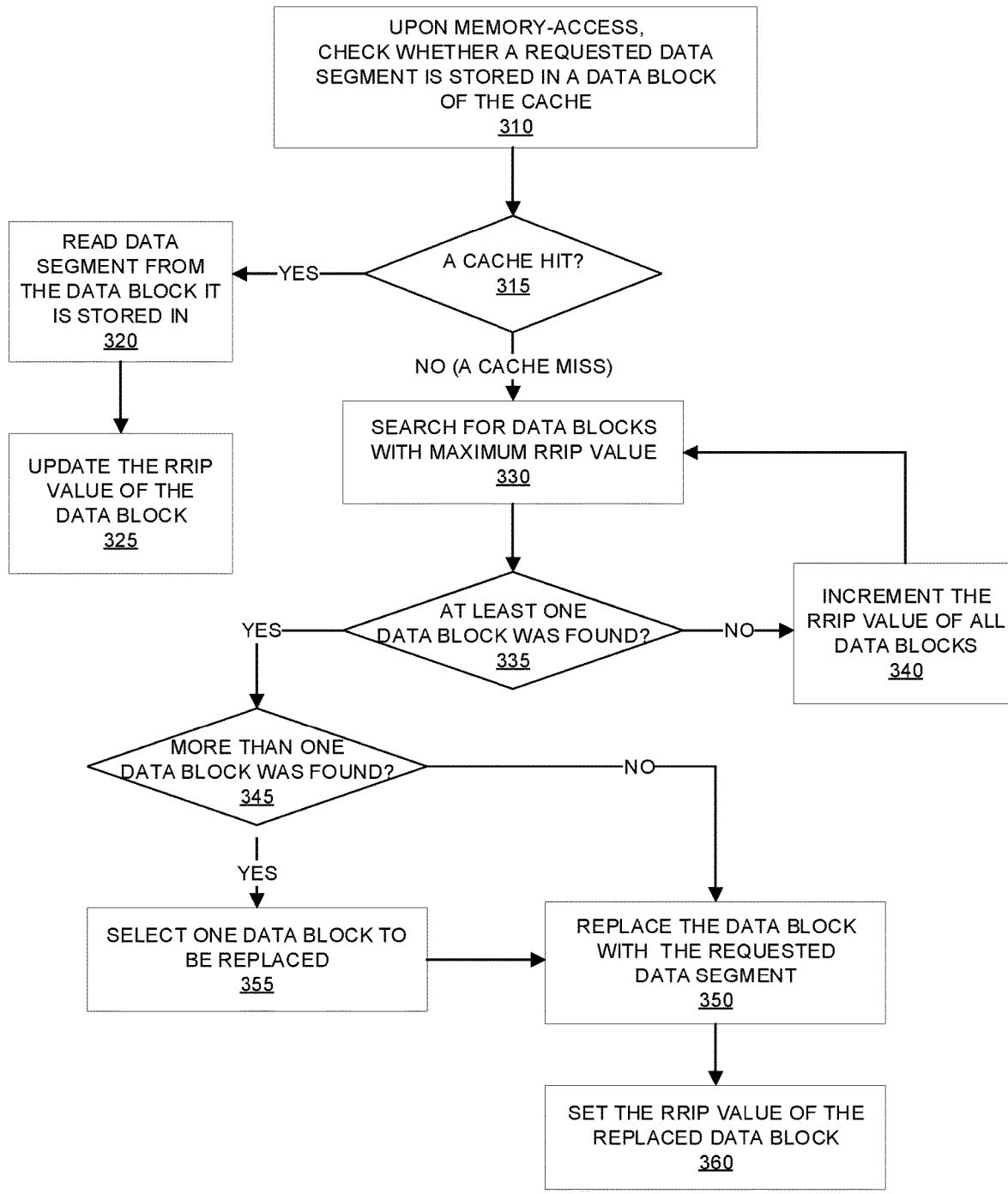
FIG. 3 is a functional block diagram of an example cache replacement method based on a Re-Reference Interval Prediction (RRIP) framework, based on which one or more features of the disclosure can be implemented.

FIG. 3 is a functional block diagram of an example cache replacement method 300 based on an RRIP framework, based on which one or more features of the disclosure can be implemented. When a processor executes an instruction that involves a memory access (e.g., a memory-read or a memory-write), in step 310, the cache is checked to see whether the data segment to be accessed (i.e., the requested data segment) is already stored in a data block of the cache. Checking to see whether a requested data segment is already stored in a data block of the cache can be done, for example, as described above with reference to FIG. 2. If the requested data segment is already stored in a data block of the cache, a cache hit occurred 315, and, thus, in step 320, the data segment can be read from the data block. Following a re-reference for a data block 320, the re-reference interval prediction value associated with the data block can be updated according to a hit promotion policy, in step 325. If the requested data segment is not stored in any of the data blocks of the cache, a cache miss occurred 315, and, thus, one of the data blocks of the cache has to be evicted (e.g., if there are no invalid blocks that can be used)—that is, the requested data segment will be fetched from the main memory and will be copied into a data block that has been selected by the replacement algorithm 300 to be replaced.

Various cache replacement algorithms apply different replacement policies. In an RRIP framework for cache replacement, the data block that is least likely to be referenced will be evicted. For example, an RRIP framework can maintain M-bits, associated with each data block in the cache, where $2^m-1$ RRIP values can be represented. Thus, a zero RRIP value indicates that a data block is predicted to be re-referenced in the near-immediate future; a $2^m-1$ RRIP value indicates that a data block is predicted to be re-referenced in the distant future. For example, in a case where M=2, four RRIP values are possible: [0, 1, 2, 3], the lower the RRIP value is, the sooner the respective data block is predicted to be re-referenced.

Hence, when a cache miss occurs, data blocks with the maximum RRIP value—those predicted to be referenced later than all the other data blocks—are searched in step 330. In an aspect, data blocks with RRIP values within a range including the maximum RRIP value may be search. If no data blocks with the maximum RRIP value (or within a range including the maximum RRIP value) have been found, the RRIP values of all the data blocks are incremented by one, in step 340, and another search is ensued 330. Otherwise, in step 345, if more than one data block with the maximum RRIP value (or within a range including the maximum RRIP value) has been found, one data block is selected to be replaced, in step 355. If exactly one data block with the maximum RRIP value (or within a range including the maximum RRIP value) was found, that block is replaced 350. Hence, in the case where more than one data block with the maximum RRIP value (or more than one data block with RRIP value within a range including the maximum RRIP value) has been found, a procedure for selecting one data block to be replaced has to take place 355. A simple selection procedure that can be employed is to select the data block with the smallest index, for example. As disclosed herein, a tree-based PLRU selection procedure can be used, as described in detail below.

After it is determined which data block will be replaced, the requested data segment is fetched from the main memory and stored in that data block, in step 350. For example, if data block 220.n is the one to be replaced, the requested data segment 250 is copied into data block 220.n, the address 215.n is updated with the address 255 of the data segment 250 in the main memory 240, and, possibly, one or more flag bits are updated, for example, to reflect that the data block content is valid. Then, in step 360, the RRIP value of the replaced data block can be set depending on how soon the replaced data block 220.n is expected to be re-referenced. What would be a reasonable re-reference interval prediction depends on the processor's (or the application's it executes) memory access patterns. The replacement algorithm can learn the likely re-reference interval, for example, by assigning a high RRIP value when a data block is replaced, in step 360, and then reducing this RRIP value by one each time this data block is re-referenced, in step 320.

Figure 4:
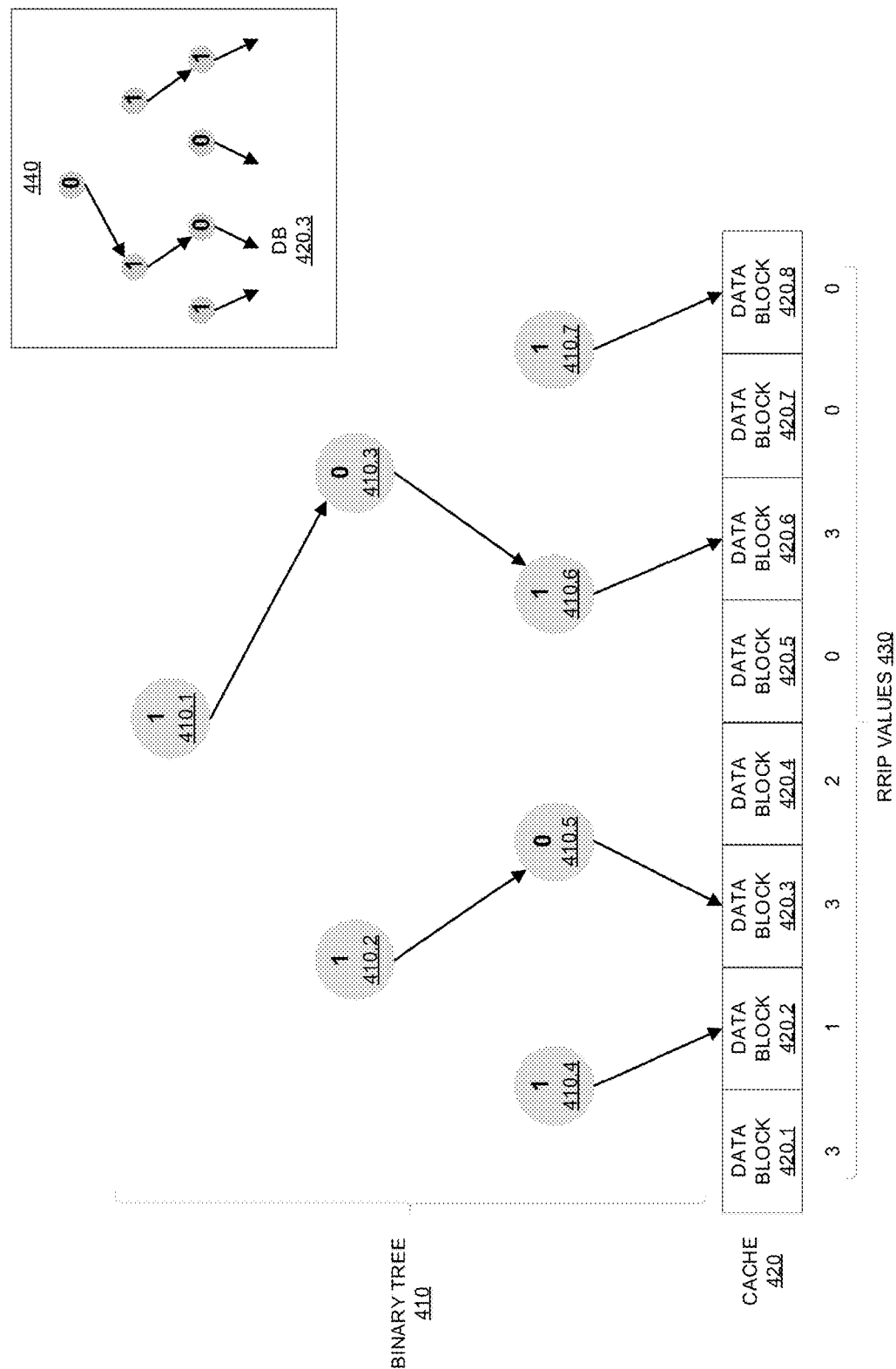
FIG. 4 is a block diagram of an example tree-based pseudo-LRU (PLRU) selection procedure, based on which one or more features of the disclosure can be implemented.

FIG. 4 is a block diagram 400 of an example tree-based PLRU selection procedure, based on which one or more features of the disclosure can be implemented. A PLRU is a replacement algorithm that approximates the LRU replacement algorithm. The LRU algorithm basically replaces the data block with the oldest access time (the least recently accessed data block), while the PLRU algorithm provides an approximated result to the data block with the oldest access time. The tree-based PLRU algorithm, although it performs with a slightly higher miss ratio, has better latency, uses less power, and has lower overhead compared with the LRU algorithm. The tree-based PLRU maintains a binary tree that points to the next data block to be replaced. Hence, the binary tree 410 of an PLRU algorithm maintains a path to a data block with an approximated oldest access time.

As demonstrated in FIG. 4, in the current state of the tree, data block 420.6 is pointed to be replaced via a tree-path including nodes 410.1, 410.3, and 410.6 in the binary tree. Generally, a node with a value "1" points to (or is connected via a tree branch to) a lower node on the right and a node with a value "0" points to (or is connected via a tree branch to) a lower node on the left. Each time a data block, such as data block 420.6, is replaced, the nodes that led to it (410.1, 410.3, and 410.6) are flipped (changing their values, and, thereby, the lower nodes they point to), so that another data block in the cache is pointed to as demonstrated by tree 440 that now points to data block 420.3 to be the next one to be replaced.

As described above, with reference to FIG. 3, when more than one data block has the maximum RRIP value, a selection procedure can be applied to select one data block therefrom to be replaced (step 355). A selection procedure, disclosed herein, can utilize the binary tree of a tree-based PLRU algorithm. FIG. 4, demonstrates a cache 420 with eight data blocks, 420.1-420.8 and respective RRIP values 430. As shown, three data blocks (420.1, 420.3, and 420.6) have a maximum RRIP value of 3. Thus, a selection procedure can be employed that selects one data block based on the current state of the binary tree 410. As explained above, the binary tree 410 points to data block 420.6. Since that block is one of the three blocks with the maximum RRIP value, that block will be selected to be replaced. Otherwise, in a scenario where, for example, data block 420.6 has an RRIP value of 2 and only two blocks, 420.1 and 420.3, have the maximum RRIP value of 3, since the tree in its current state does not point to one of the data blocks with the maximum RRIP value, the selection procedure can start from a lower level of the tree. For example, the selection procedure can start from node 410.2 and follow a path that leads to a data block with the maximum RRIP value, in this case data block 420.3 (via node 410.5).

In an alternative, the selection procedure can start from the lowest level of the tree first (e.g., 410.4, 410.5, 410.6, and 410.7). If multiple blocks with maximum RRIP value are pointed to at that level (e.g., 420.1, 420.3, and 420.6), we then can go to the next level (e.g., 410.2 and 410.3), and if from that level still multiple blocks with maximum RRIP value are pointed to (e.g., 420.3 and 420.6), we can go to a higher level of the tree until only one block is pointed to. At the highest level of the tree, e.g., 410.1, only one block is pointed to, 420.6, that block can be selected to be replaced. In an aspect, data blocks 420.1, 420.3, and 420.6 can have associated with them RRIP values within a range including the maximum RRIP value. In such a case, a selection of one data block therefrom can be performed as if they all had associated with them a maximum RRIP value, as described above.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for cache replacement, comprising:
   determining, by a cache controller, a re-reference interval prediction (RRIP) value associated with each data block in a cache;
   accessing, by a processor, a data segment in memory; and
   in response to the data segment not being stored in the cache, selecting a data block in the cache to be replaced by the data segment, wherein the selecting the data block comprises:
   searching for data blocks in the cache associated with values having a maximum RRIP value, and
   selecting one of at least two data blocks based on a binary tree, responsive to finding the at least two data blocks having the maximum RRIP value,
   wherein the selecting one of the at least two data blocks based on the binary tree includes selecting a different starting level in the binary tree responsive to a current state of the binary tree pointing to a data block other than the at least two data blocks.

2. The method of claim 1, wherein the selecting one of the at least two data blocks based on the binary tree further includes:
   selecting the data block with the maximum RRIP value that is the only one pointed to from one level of the binary tree.

3. The method of claim 1, wherein the RRIP value represents a likelihood that an associated data block will be re-used within a time interval.

4. The method of claim 1, wherein a larger RRIP value corresponds to a time interval farther in the future.

5. The method of claim 1, wherein the searching further comprises:
   when no data block associated with maximum RRIP value is found:
   increasing the RRIP value associated with each of the data blocks in the cache, and
   repeating the searching.

6. The method of claim 1, wherein the searching further comprises:
   when one data block associated with the maximum RRIP value is found, selecting the one data block as the data block.

7. The method of claim 1, further comprising:
upon an access, by the processor, to a data segment, if the data segment is stored in a data block in the cache, updating the RRIP value associated with the data block.

8. The method of claim 1, wherein the binary tree tracks recency of data blocks in the cache.

9. A system, comprising:
at least one processor; and
memory storing instructions that, when executed by the at least one processor, cause the system to:
determine, by a cache controller, an RRIP value associated with each data block in a cache,
access, by the at least one processor, a data segment in a memory, and
in response to the data segment not being stored in the cache, select a data block in the cache to be replaced by the data segment, wherein the data block is selected by a process that comprises:
searching for data blocks in the cache associated with values having a maximum RRIP value, and
selecting one of at least two data blocks based on a binary tree, responsive to finding the at least two data blocks having the maximum RRIP value,
wherein the selecting one of the at least two data blocks based on the binary tree includes selecting a different starting level in the binary tree responsive to a current state of the binary tree pointing to a data block other than the at least two data blocks.

10. The system of claim 9, the selecting one of the at least two data blocks based on the binary tree includes the binary tree further includes:
selecting the data block with the maximum RRIP value that is the only one pointed to from one level of the binary tree.

11. The system of claim 9, wherein the RRIP value represents a likelihood that an associated data block will be re-used within a time interval.

12. The system of claim 9, wherein a larger RRIP value corresponds to a time interval farther in the future.

13. The system of claim 9, wherein the searching further comprises:
when no data block associated with the maximum RRIP value is found:
increasing the RRIP value associated with each of the data blocks in the cache, and
repeating the searching.

14. The system of claim 9, wherein the searching further comprises:
when one data block associated with the maximum RRIP value is found, selecting the one data block as the data block.

15. The system of claim 9, further comprising instructions that cause the system to:
upon an access, by the at least one processor, to a data segment, if the data segment is stored in a data block in the cache, updating the RRIP value associated with the data block.

16. A non-transitory computer-readable medium comprising instructions executable by at least one processor to:
determine, by a cache controller, an RRIP value associated with each data block in a cache, the RRIP value representing a likelihood that an associated data block will be re-used within a time interval, wherein a larger RRIP value corresponds to a time interval farther in the future;
access, by the at least one processor, a data segment in memory; and
in response to the data segment not being stored in the cache, select a data block in the cache to be replaced by the data segment, wherein the selecting a data block comprises:
searching for data blocks in the cache associated with values having a maximum RRIP value, and
selecting one of at least two data blocks based on a binary tree, responsive to finding the at least two data blocks having the maximum RRIP value,
wherein the selecting one of the at least two data blocks based on the binary tree includes selecting a different starting level in the binary tree responsive to a current state of the binary tree pointing to a data block other than the at least two data blocks.

17. The non-transitory computer-readable medium of claim 16, wherein the searching further comprises:
when no data block associated with the maximum RRIP value is found:
increasing the RRIP value associated with each of the data blocks in the cache, and
repeating the searching.

18. The non-transitory computer-readable medium of claim 16, wherein the searching further comprises:
when one data block associated with the maximum RRIP value is found, selecting the one data block as the data block.

19. The non-transitory computer-readable medium of claim 16, further comprising instructions executable by the at least one processor to:
upon an access, by a processor, to a data segment, if the data segment is stored in a data block in the cache, update the RRIP value associated with the data block.

20. The method of claim 1, wherein the binary tree is a Pseudo-Least Recently Used (PLRU) tree that points to a next block in the cache to be replaced.

21. The system of claim 9, wherein the binary tree is a Pseudo-Least Recently Used (PLRU) tree that points to a next block in the cache to be replaced.

22. The non-transitory computer-readable medium of claim 16, wherein the binary tree is a Pseudo-Least Recently Used (PLRU) tree that points to a next block in the cache to be replaced.

* * * * *